Nov. 19, 1963     S. M. BAGNO     3,111,657
COMPENSATION FOR TURBULENCE AND OTHER EFFECTS
IN INTRUDER DETECTION SYSTEMS
Filed March 16, 1960     2 Sheets-Sheet 1

INVENTOR
SAMUEL M. BAGNO
BY
AGENT

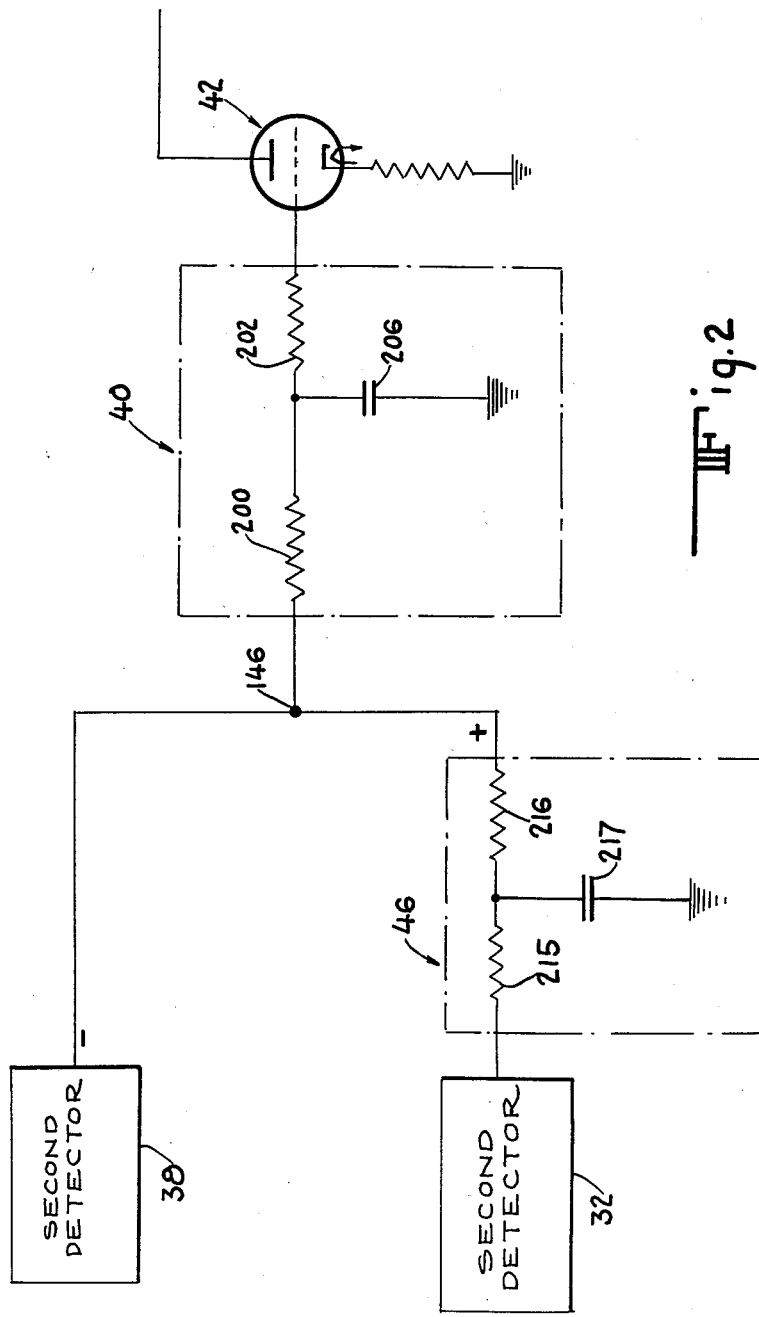

United States Patent Office 3,111,657
Patented Nov. 19, 1963

3,111,657
COMPENSATION FOR TURBULENCE AND OTHER
EFFECTS IN INTRUDER DETECTION SYSTEMS
Samuel M. Bagno, Belleville, N.J., assignor to Specialties
Development Corporation, Belleville, N.J., a corporation of New Jersey
Filed Mar. 16, 1960, Ser. No. 15,484
3 Claims. (Cl. 340—258)

The present invention relates to an intruder detection system which functions by receiving radiations emanating or reflecting from a moving object, and, more particularly, to such a system which is an improvement over the type of system disclosed in United States Patent 2,794,974, dated January 4, 1957.

In the system of the above patent, a space to be protected is filled with radiations of a given comparatively high frequency or frequencies by transmitting such radiations into the space to be reflected from walls or objects in the space. Motion within the space is detected by receiving the reflected radiations and comparing their frequency with the frequency of the transmitted radiations. If no motion occurs within the space, the frequency of the received radiations will be the same as the frequency of the transmitted radiations. If there should be motion in the room, however, the waves reflected from or otherwise affected by the moving object will have a frequency different from the transmitted frequency, the frequency change usually being due to a Doppler effect and hence being termed the Doppler frequency.

To detect the presence or absence of such Doppler frequencies, the received signal is beat with the transmitted signal in a mixer. If the frequency of the received radiations differs from the frequency of the transmitted radiations, the output of the mixer will contain a Doppler frequency signal having a frequency equal to the difference between the frequencies of the transmitted and received radiations. The Doppler frequency signal is separated from the other signals present in the mixer output and is utilized to initiate the actuation of an alarm.

Doppler frequency signals are produced by occurrences other than the motion of an intruder, such as air turbulence or flame, and it is highly desirable that such systems respond to the motion of an intruder and to the presence of a flame but not to the presence of air turbulence.

As discussed in the above patent, the motion of an intruder and the presence of a flame both produce a spectrum of Doppler frequency signals which have a relatively constant magnitude throughout at least a substantial portion of the spectrum, while air turbulence produces Doppler frequencies which vary in magnitude substantially linearly from a relatively large amplitude signal at the lower end of the spectrum to a relatively small amplitude signal at the high end of the spectrum.

To distinguish between Doppler frequency signals produced by a moving intruder or an open flame and those produced by air turbulence, the system disclosed in the above patent includes a pair of parallel channels, one of which passes only the higher Doppler frequency signals, the other of which passes only the lower Doppler frequency signals. In the first mentioned channel, the high Doppler frequency signals are amplified and rectified in a manner to provide a negative going signal; and, in the second mentioned channel, the low Doppler frequency signal is passed without amplification and is rectified to produce a positive going signal.

The outputs of the channels are simultaneously introduced into an integrator included in the input circuit of an alarm actuating electron tube normally biased for conduction.

As previously mentioned, the Doppler frequency signals produced by a moving intruder or a flame contain low and high frequency components of substantially equal amplitude. Therefore, when these signals are passed through the channels, the negative going output of the high frequency channel being amplified will exceed the positive going output of the low frequency channel and the input of the integrator will be negative. As a result, the tube will be driven to cut off and cause the alarm to sound.

When the Doppler frequency signals are produced by air turbulence the high frequency signal is of such low amplitude with respect to the amplitude of the low frequency signal that, even after amplification thereof in the high frequency channel, the output of the high frequency channel does not exceed the output of the low frequency channel and an alarm is not given.

However, false alarms sometimes are produced in response to Doppler frequencies produced by air turbulence since the high and low frequency Doppler signals are each random in nature, whereby a high frequency Doppler signal may be received at a time when no low frequency Doppler signal is present and an alarm results although low frequency signals were received before and after the reception of the high frequency signal.

The integrator provided in the system of the aforementioned patent is capable of effectively averaging the high frequency Doppler signals over a long period of time since the time constant of the integrator is much greater than the period of the high frequency. However, the time constant of the integrator is on the same order as the period of the low frequency Doppler signals, therefore, the integrator will not effectively average the low frequency signals over a long time.

When both high and low frequency Doppler signals are received randomly, the integrator will produce an output which is the difference between a continuously present voltage, produced by the effective averaging of high frequency signals, and a sporadic voltage produced by the low frequency signals, which are not effectively averaged. It can be seen therefore, that, where a moderate time lapse exists between received low frequency signals, the voltage produced by the ineffective averaging of the low frequency signals will, at times, fail to cancel out the high frequency produced voltage and a false alarm will occur.

If the integrator were constructed so that its time constant were long enough with respect to the period of the low frequency to provide effective averaging, then the time constant would be so long with respect to the high frequency period that an excessive time (6 seconds) would be required for an intruder to cause an alarm, whereby an intruder could walk in spurts and avoid detection.

Accordingly, it is an object of the present invention to provide an improved intruder detection system which is not subject to the aforementioned difficulties.

Another object is to provide such a system which more effectively distinguishes between the effects of turbulence and the effects of an intruder or flame.

Another object is to provide such a system in which randomly received low frequency signals are effectively averaged for comparison with randomly received high frequency signals.

Another object is to provide means for effectively determining the relation between the average amplitudes of randomly occuring high and low frequency signals.

Another object is to provide such means which effectively averages both high and low frequency signals and compares the averaged signals to produced an output indicating the relationship therebetween.

A further object is to produce such as improved system by modifying the aforementioned prior art system in a simple and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

FIG. 2 is a schematic diagram illustrating in detail a portion of the system shown in FIG. 1.

Figure 1:
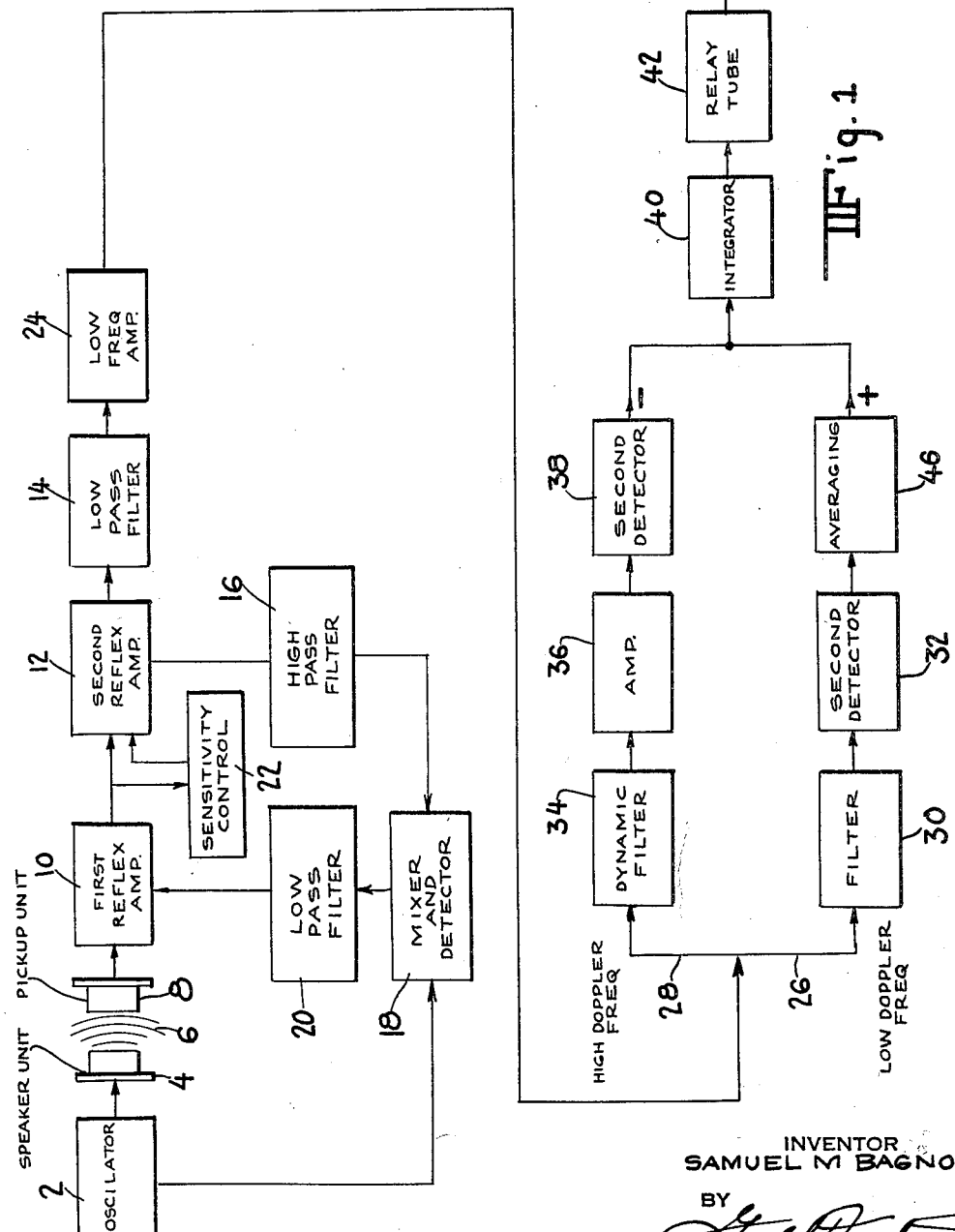
FIG. 1 is a schematic block diagram of a detection system in accordance with the present invention.

Referring to the drawings in detail and more particularly to FIG. 1 thereof, there is shown an intruder detection system in accordance with the present invention in which an oscillator unit 2 generates energy at a predetermined high frequency, preferably but not necessarily in the ultrasonic range, which is transmitted into the space to be protected by means of a transducer 4. That energy, schematically represented by the curved lines 6 in FIG. 1, traverses the space to be protected, is reflected from objects therein and is received and converted into electrical signals by the receiving transducer 8. If there is no movement in the space being protected, the frequency received by the pickup unit 8 will be identical with that transmitted by the speaker unit 4. On the other hand, if there is motion in the space being protected, either motion of a discrete object, acceleration of the air due to turbulence or some similar phenomenon, or the movement of an open flame, or if a shock sound or other transient effect should be detected, the signal from the pickup unit 8 will be composed of the transmitted frequency plus frequencies differing therefrom by a given amount depending on the rapidity of the motion or on the particular characteristic of the shock sound or transient effect.

These signals, all substantially at a high frequency in the ultrasonic range or above, are amplified by first and second reflex amplifier stages 10 and 12. Connected to the second reflex amplifier stage 12, and defining two independent paths therefrom, are low pass filter 14 and high pass filter 16. The low pass filter 14 rejects signals having a frequency in the range of the transmitted signals, whereas the high pass filter 16 permits such signals to pass therethrough. Consequently the amplified signals in the ultrasonic range pass through the high pass filter 16 to a mixer and detector 18, the latter also having an input from the oscillator 2.

In the mixer and detector 18, the received signals are beat against a frequency corresponding to that of the transmitted energy, and the resultant difference frequency is detected. If the received and transmitted energy are both at the same frequency, there is no difference frequency, and consequently the Doppler output from the mixer and detector 18 is zero. On the other hand, if the received signals include frequencies which differ from the transmitted frequency, then there will be an output of the mixer and detector 18 at a frequency equal to the difference between the transmitted and received frequencies. The difference frequency is the Doppler frequency.

The output of the mixer and detector 18 goes to a low pass filter 20 which just permits the difference frequency to pass, but will not pass the high frequencies actually received by the pickup unit 8. That difference frequency, hereinafter termed the Doppler signal, returns to the first reflex amplifier 10, where it is amplified. From there it goes to the second reflex amplifier 12 via a sensitivity control 22, the circuitry being such that the sensitivity control 22 is active substantially only on the Doppler signal and not on the high frequency signal. Since the Doppler signal is at a comparatively low frequency, for example, below 100 cycles per second, it is rejected by the high pass filter 16 but goes from amplifier stage 12 through the low pass filter 14 to a third amplification stage 24.

The output of the amplifier 24 is connected to a low frequency line 26 and a high frequency line 28. The low frequency line 26 includes a filter 30 which will pass Doppler frequencies at the low end of the Doppler spectrum but which will reject frequencies at the high end thereof. The output from the filter 30 is detected at 32, the resultant detected signal being positive in sign. The high frequency line 28 includes a "dynamic" filter 34 which will pass signals at the high end of the Doppler spectrum but which will reject signals at the low end thereof. The output from the filter 34 is amplified at 36 and the resultant signals are detected at 38, the output of the detector 38 being negative in sign.

The positive output from the low Doppler frequency detector 32 and the negative output from the high Doppler frequency detector 38 are both fed to an integrator 40 the output of which controls a relay tube 42 which in turn controls the alarm relay 44. Since the high Doppler frequency signals 38 are amplified at 36, whereas the low Doppler frequency signals are not thus amplified, the net effect is that the low Doppler frequency signals are attenuated relative to the high Doppler frequency signals. The relay tube 42 is so biased as normally to pass current and energize the alarm relay 44 so as to keep the alarm from being actuated. This arrangement is preferred because of its "fail-safe" character. The alarm relay 44 will be actuated provided that a sufficiently negative bias is superimposed on the relay tube 42 so as to bias that tube to cut-off. The high Doppler frequencies, if applied alone to the tube 42, would accomplish this result. The low Doppler frequencies, when applied, tend to prevent the high Doppler frequencies from accomplishing this result. If a turbulence signal is received, in which the high Doppler frequencies have a much lower amplitude than the low Doppler frequencies, those high Doppler frequencies, even after being amplified at 36, nevertheless are substantially cancelled by the low Doppler frequencies, the tube 42 continues to conduct, and the alarm relay 44 is not actuated. On the other hand, if intruder or flame signals are detected, in which the low and high Doppler frequencies have substantially the same magnitude, the negative signals derived from the high Doppler frequency detector 38 will be considerably greater in magnitude than the low Doppler frequency signals derived from the low Doppler frequency detector 32, a negative bias will be applied to the tube 42, the alarm relay 44 will be actuated or deenergized, and the alarm will be set off.

The system described thus far is substantially the same as that disclosed in the aforementioned patent which as previously described was occasionally false alarmed by air turbulence because of the random nature of the low frequency Doppler signal produced by the air turbulence.

An averaging circuit 46 having a time constant which is long with respect to the period of the low frequency Doppler signal is provided in the low Doppler frequency line between the output of the second detector 32 and the input of the integrator 40. The circuit 46 averages the low frequency Doppler signals over a long period of time and delivers to the integrator 40 a constant voltage representing this average. Thus the system is capable of distinguishing between turbulence effects and the effects of an intruder or flame irrespective of the random character of the Doppler signals created by the turbulence.

In practice a suitable line of demarcation between the high Doppler frequencies which are conducted through the line 28 and the low Doppler frequencies which are conducted through the line 26 is 5 c.p.s. Up to this frequency the Doppler signals produced by turbulence, intruder and flame effects are approximately equal in magnitude, whereas above this frequency the magnitudes of the Doppler signals produced by turbulence effects are much less than those produced by flame and intruder effects.

To provide sharp discrimination between turbulence effects and the effects of an intruder or flame the filter 30 is designed to pass frequencies up to 5 c.p.s. and the filter 34 is designed to pass frequences from 35 to 50 c.p.s.

As shown in FIG. 2 the integrator 40 comprises a 470,000 ohm resistor 200 and a 2.2 megohm resistor 202 connected in series between the grid of the relay tube 42 and the junction point 146 of the outputs of the high and low Doppler frequency channels, and a .5 mfd. condenser 206 connected between ground and the junction point of the resistors 200 and 202.

The charging time constant of the integrator is .235 second which is approximately 8 times the period of a 35 c.p.s. signal (.043 sec.) and is approximately equal to the period of a 5 c.p.s. signal (.20 sec.). It can be seen, therefore, that the high frequency Doppler signals (35 to 50 c.p.s.) are effectively averaged in by integrator 40.

The averaging circuit 46 comprises two 5.6 megohm resistors 215 and 216 connected in series between the point 146 and the output of the detector 32, and a 2 mfd. capacitor 217 connected between ground and the junction point of the resistors 215 and 216.

The time constant of the averaging circuit 46 is 11.2 sec. which is long in comparison to the period of the low frequency Doppler signal.

The low frequency Doppler signal is therefore effectively averaged before introduction into the integrator 40 so that the output of the integrator represents the difference between the average values of the high and low frequency Doppler signals.

From the foregoing, it can be seen that the present invention provides an improved intruder detection system which more effectively distinguishes between the effects of air turbulence and the effects of an intruder or flame.

While the invention has been described solely with reference to a Doppler frequency detection system operating on a transmitted frequency in the ultrasonic range, it is apparent that the invention could be applied to Doppler frequency detection systems utilizing transmitted frequencies in other ranges, and could be applied in systems other than Doppler effect detection systems.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A network for determining the amplitude relationship between the output of a high frequency signal source and the output of a low frequency signal source, said network comprising an averaging circuit having an input connected to said low frequency signal source and having a time constant which is long with respect to the period of the low frequency signal and having an output for averaging said low frequency signal, an integrating circuit having a time constant which is long with respect to the period of the high frequency signal, said integrating circuit having an input connected to said high frequency signal source and to said averaging circuit output for averaging said high frequency signal and for comparing the averaged high and low frequency signals, and means for giving an indication in accordance with the result of said comparison.

2. A network for eliminating the effects of certain extraneous conditions in a detection system including means for radiating energy of a given frequency into a space, means for receiving the frequencies as modified by disturbances in the space, and means for selecting received energy within a frequency spectrum; said network comprising means for deriving from the received frequencies separate signals within comparatively low and high frequency ranges respectively, said deriving means having separate outputs for said high and low frequency signals,; an averaging circuit having an input connected to said low frequency output of said deriving means and having a time constant which is long with respect to the period of the signal in the low frequency range and having an output for averaging said signal of the low frequency range, an integrating circuit having a time constant which is long with respect to the period of the signal in the high frequency range, said integrating circuit having an input connected to said high frequency output of said deriving means and to said averaging circuit output for averaging said signal of the high frequency range and for comparing the averaged high and low frequency signals, and means for giving an indication in accordance with the result of said comparison.

3. A network for eliminating the effects of certain extraneous conditions in a detection system including means for radiating energy of a given frequency into a space, means for receiving the frequencies as modified by disturbances in the space, and means for selecting received energy within a frequency spectrum; said network comprising means for deriving from the received frequencies separate signals within comparatively low and high frequency ranges respectively, said deriving means having separate outputs for said high and low frequency signals, means for modifying the amplitude of the signal of one of said ranges differently than the amplitude of the signal of the other of said ranges, an averaging circuit having an input connected to said low frequency output of said deriving means and having a time constant which is long with respect to the period of the signal in the low frequency range and having an output for averaging the amplitude of said signal of the low frequency range, an integrating circuit having a time constant which is long with respect to the period of the signal in the high frequency range, said integrating circuit having an input connected to said high frequency output of said deriving means and to said averaging circuit output for averaging the amplitude of said signal of the high frequency range and for comparing the average amplitudes of said high and low frequency signals, and means for giving an indication in accordance with the result of said comparison.

References Cited in the file of this patent

UNITED STATES PATENTS

| | | |
|---|---|---|
| 2,794,974 | Bagno et al. | June 4, 1957 |
| 2,978,577 | Ketchledge | Apr. 4, 1961 |